US010071747B2

(12) United States Patent
Roth et al.

(10) Patent No.: US 10,071,747 B2
(45) Date of Patent: *Sep. 11, 2018

(54) SYSTEM FOR A VEHICLE

(71) Applicant: Harman Becker Automotive Systems GmbH, Karlsbad (DE)

(72) Inventors: Hans Roth, Karlsruhe (DE); Olaf Preissner, Kirchheim unter Teck (DE); Christoph Reifenrath, Erftstadt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 152 days.

This patent is subject to a terminal disclaimer.

(21) Appl. No.: 14/654,484

(22) PCT Filed: Dec. 19, 2013

(86) PCT No.: PCT/EP2013/003864
§ 371 (c)(1),
(2) Date: Jun. 19, 2015

(87) PCT Pub. No.: WO2014/095071
PCT Pub. Date: Jun. 26, 2014

(65) Prior Publication Data
US 2015/0331238 A1 Nov. 19, 2015

Related U.S. Application Data

(60) Provisional application No. 61/745,229, filed on Dec. 21, 2012.

(51) Int. Cl.
*G02B 27/01* (2006.01)
*B60W 50/10* (2012.01)
(Continued)

(52) U.S. Cl.
CPC ............. *B60W 50/10* (2013.01); *B60K 35/00* (2013.01); *B60K 37/00* (2013.01); *B60Q 9/008* (2013.01);
(Continued)

(58) Field of Classification Search
CPC ................................ B60W 50/10; H04W 4/80
See application file for complete search history.

(56) References Cited

U.S. PATENT DOCUMENTS 6,998,972 B2 * 2/2006 Geisler .................. G06Q 10/00
340/438
7,206,686 B2 * 4/2007 Sawamoto ......... B60K 31/0008
180/170
(Continued)

FOREIGN PATENT DOCUMENTS

DE 102005010843 * 9/2006
DE 102005010843 A1 9/2006
(Continued)

OTHER PUBLICATIONS

Angelos Amditis et al. Towards the Automotive HMI of the Future: Overview of the AIDE-Integrated Project Results; IEEE Transactions on Intelligent Transportation Systems, vol. 11, No. 3, Sep. 2010.*

(Continued)

*Primary Examiner* — Jay Patel
*Assistant Examiner* — Irfan Habib
(74) *Attorney, Agent, or Firm* — McCoy Russell LLP

(57) ABSTRACT

Embodiments are disclosed for systems for a vehicle. An example system for a vehicle includes a head-up display and a circuit, which is connected to the head-up display, wherein the head-up display is configured to project an image onto a front windshield of the vehicle or onto a separate combiner, wherein the circuit is configured to output image data to the
(Continued)

head-up display, whereby the image data have a set of objects which include messages for the user, to determine a user's workload level, based on a set of driving conditions, to switch between at least one first workload mode and a second workload mode based on the level, whereby the second workload mode is assigned a higher level than the first workload mode, and in the second workload mode to reduce at least one object, which is output in the first workload mode.

15 Claims, 7 Drawing Sheets

(51) Int. Cl.
| | |
|---|---|
| B60R 11/02 | (2006.01) |
| H04N 13/02 | (2006.01) |
| H04N 13/04 | (2006.01) |
| H04N 9/31 | (2006.01) |
| B60K 35/00 | (2006.01) |
| B60Q 9/00 | (2006.01) |
| H04M 3/54 | (2006.01) |
| H04M 1/60 | (2006.01) |
| H04W 4/80 | (2018.01) |
| H04N 13/243 | (2018.01) |
| H04N 13/279 | (2018.01) |
| H04N 13/282 | (2018.01) |
| H04N 13/363 | (2018.01) |
| B60K 37/00 | (2006.01) |
| G01C 21/36 | (2006.01) |
| H04W 4/04 | (2009.01) |
| H04W 4/16 | (2009.01) |
| G08G 1/00 | (2006.01) |
| G08G 1/0962 | (2006.01) |
| G06F 3/01 | (2006.01) |
| G06F 3/0481 | (2013.01) |
| H04N 101/00 | (2006.01) |

(52) U.S. Cl.
CPC ........ *B60R 11/0229* (2013.01); *G01C 21/365* (2013.01); *G02B 27/01* (2013.01); *G02B 27/0101* (2013.01); *G06F 3/013* (2013.01); *G06F 3/017* (2013.01); *G06F 3/0481* (2013.01); *G08G 1/00* (2013.01); *G08G 1/09623* (2013.01); *H04M 1/6075* (2013.01); *H04M 3/543* (2013.01); *H04N 9/31* (2013.01); *H04N 13/0242* (2013.01); *H04N 13/0278* (2013.01); *H04N 13/0282* (2013.01); *H04N 13/0459* (2013.01); *H04N 13/243* (2018.05); *H04N 13/279* (2018.05); *H04N 13/282* (2018.05); *H04N 13/363* (2018.05); *H04W 4/046* (2013.01); *H04W 4/16* (2013.01); *H04W 4/80* (2018.02); *B60K 2350/1052* (2013.01); *B60K 2350/1072* (2013.01); *B60K 2350/1076* (2013.01); *B60K 2350/2052* (2013.01); *B60K 2350/2095* (2013.01); *G02B 2027/014* (2013.01); *G02B 2027/0138* (2013.01); *G02B 2027/0141* (2013.01); *G06F 2203/04804* (2013.01); *H04N 2101/00* (2013.01)

(56) References Cited

U.S. PATENT DOCUMENTS

| | | | | |
|---|---|---|---|---|
| 7,394,393 B2* | 7/2008 | Zhang | ................... | B60W 40/09 340/573.1 |
| 8,305,234 B2* | 11/2012 | Tauchi | ................... | G08G 1/091 340/576 |
| 8,766,710 B1* | 7/2014 | Finch | ...................... | G06F 13/00 327/544 |
| 8,914,236 B2* | 12/2014 | Sakoda | ................... | G06F 17/00 702/2 |
| 9,189,596 B2* | 11/2015 | Chen | ......................... | A61B 5/16 |
| 9,213,522 B2* | 12/2015 | Prakah-Asante | ......... | G06F 7/00 |
| 9,311,706 B2* | 4/2016 | Natroshvili | ............. | G06T 5/006 |
| 9,479,706 B2* | 10/2016 | Quast | ................. | H04N 5/23203 |
| 9,497,595 B2* | 11/2016 | Shin | ........................ | G01C 21/36 |
| 9,679,359 B2* | 6/2017 | Huebner | ................... | B60R 1/00 |
| 9,802,622 B2* | 10/2017 | Park | ....................... | B60W 50/08 |
| 9,811,935 B2* | 11/2017 | Filev | ...................... | G06T 13/40 |
| 9,944,298 B2* | 4/2018 | Yamada | ................. | B60W 50/10 |
| 2001/0012976 A1 | 8/2001 | Menig et al. | | |
| 2003/0125846 A1* | 7/2003 | Yu | ........................ | G08G 1/0962 701/1 |
| 2003/0142041 A1* | 7/2003 | Barlow | .................. | A61B 3/113 345/8 |
| 2013/0018545 A1* | 1/2013 | Prakah-Asante | ...... | G08G 1/166 701/36 |

FOREIGN PATENT DOCUMENTS

| | | | |
|---|---|---|---|
| DE | 102006032118 | * | 1/2008 |
| DE | 102006032118 A1 | | 1/2008 |
| JP | H09123848 A | | 5/1997 |
| JP | 2008168799 A | | 7/2008 |
| WO | 9813224 A1 | | 4/1998 |

OTHER PUBLICATIONS

Rosito Jung et al. Augmented Reality with Automatic Camera Calibration for Driver Assistance Systems.*

Wu, C. et al., "Development of an Adaptive Workload Management System Using the Queuing Network-Model Human Processor (QN-MHP)," IEEE Transactions on Intelligent Transportation Systems, vol. 9, No. 3, Sep. 2008, 13 pages.

Amditis, A. et al., "Towards the Automotive HMI of the Future: Overview of the AIDE-Integrated Project Results," IEEE Transactions on Intelligent Transportation Systems, vol. 11, No. 3, Sep. 2010, 12 pages.

ISA European Patent Office, International Search Report Issued in International Application No. PCT/EP2013/003864, dated Apr. 16, 2014, WIPO, 3 pages.

IPEA European Patent Office, International Preliminary Report on Patentability Issued in Application No. PCT/EP2013/0036864, Report Completed Apr. 17, 2015, WIPO, 6 pages.

Japan Patent Office, Office Action Issued in Japan Patent Application No. 2015-548286, dated Jul. 10, 2017, 10 pages.

* cited by examiner

SYSTEM FOR A VEHICLE

CROSS REFERENCE TO RELATED APPLICATIONS

The present application is a U.S. National Phase of International Patent Application Serial No. PCT/EP/2013/003864, entitled "SYSTEM FOR A VEHICLE," filed on Dec. 19, 2013, which claims priority to U.S. Provisional Patent Application No. 61/745,229, entitled "INFOTAINMENT SYSTEM," filed on Dec. 21, 2012, the entire contents of each of which are hereby incorporated by reference for all purposes.

TECHNICAL FIELD

The present invention relates to a system for a vehicle and a method for controlling a head-up display for a vehicle.

BACKGROUND AND SUMMARY

The article "Development of an Adaptive Workload Management System Using the Queuing Network-Model Human Processor (QN-MHP)," C. Wu et al, IEEE TRANSACTIONS ON INTELLIGENT TRANSPORTATION SYSTEMS, VOL. 9, No. 3, September 2008 describes a queuing network-model human processor for an adaptive workload management system (AWMSs) is known. The risk of vehicle collisions significantly increases when drivers are overloaded with information from in-vehicle systems. Increasingly more in-vehicle information and entertainment systems, e.g. navigation aids, mobile phones, e-mail, web browsers, vehicle-to-vehicle communication systems, and traffic information displays are being used in vehicles. One of the solutions to this problem is developing AWMSs to dynamically control the rate of messages from these in-vehicle systems. The driver's workload is estimated in several driving situations. A message controller determines the optimal delay times between messages and dynamically controls the rate of messages presented to the driver. The rate of messages is adapted to the driving conditions, e.g. speed and curvatures, and driver characteristics, e.g., age. AWMSs collect current driving information, such as steering wheel angle and lane position, and then use computational algorithms to directly estimate the current workload of the driver. To reduce the driver's workload, messages from in-vehicle systems are suppressed or messages are redirected into a voice mailbox when the driver's estimated mental workload is high. Multitasking information in driving is typically presented in a multimodal format: either through the visual (e.g., looking at a map or a display of a navigation system) or the auditory modality (e.g., listening to messages from cellular phones or warning systems). Drivers read directions for and the distance to the next turn (maneuver point) from the display (perceptual processing), perform mental calculations to decide whether and when to switch to a different lane (cognitive processing), and possibly engage the turning signal and turn the steering wheel (motor processing). The level of driver workload and performance can be estimated based on road situations, drivers' age, message properties from the in-vehicle systems change in terms of modalities, message difficulty, and motor execution time. Absolute and differential thresholds of the simulated workload can be set to determine the optimal design of the messages and whether the proposed design can produce a workload that is higher than the "redline". Global Positioning Systems (GPS) can also be used to measure road curvatures and speed on the next road section so that the AWMS can estimate the driver workload a few seconds in advance. The focus of AWMS is to reduce driver workload. It is suitable for non-urgent messages of in-vehicle systems when delaying messages for a few seconds is allowable, e.g., messages from e-mail systems and messages related to traffic congestion. For urgent messages that require immediate driver response, e.g. forward collision warning messages, no extra delays are allowed. Algorithms can manage messages with different priorities, including the order and length of these messages. Further driving conditions, such as traffic density, intersections, road curvature in the next few seconds, route planning and selections, and weather conditions may be added.

The object of the invention is to improve a system for a vehicle.

Said object is attained by a system with the features of independent claim 1. Advantageous refinements are the subject of dependent claims and included in the description.

Therefore, a system for a vehicle is provided. The system has a head-up display and a circuit, whereby the circuit is connected to the head-up display.

The head-up display is configured to project an image onto the vehicle's front windshield or onto a separate combiner.

The circuit is configured to output image data to the head-up display in order to generate the image. The image data have a set of objects which include messages for the user.

The circuit is configured to determine the user's workload level based on a set of driving conditions.

The circuit is configured, based on the level, to switch between at least one first workload mode and a second workload mode. The level assigned to the second workload mode is higher than the level assigned to the first workload mode.

The circuit is configured in the second workload mode to reduce at least one object of the set, which is output in the first workload mode.

Tests by the applicant have shown that a plurality of information can be displayed simultaneously to the driver in high resolution by the head-up display, without the driver having to look away from the traffic ahead to perceive the information. The driver's workload could be significantly reduced by a specific configuration of an adaptive workload management system by the intelligent reduction of the objects.

The invention further has the object of providing an improved method for controlling a head-up display.

Said object is attained by the method with the features of independent claim 7. Advantageous refinements are included in the description.

Therefore, a method for controlling a head-up display for a vehicle is provided. The method has the steps:

Projecting an image onto a front windshield of the vehicle or onto a separate combiner by means of the head-up display.

Outputting image data from a circuit to the head-up display to generate the image, whereby the image data have a set of objects that include messages for the user. The circuit may be connected to the head-up display.

Determining the user's workload level based on a set of driving conditions by means of the circuit.

Switching between at least one first workload mode and a second workload mode, based on the level, whereby the second workload mode is assigned a higher workload level than the first workload mode.

Reducing at least one object of the set in the second workload mode, wherein said at least one object of the set is output in the first workload mode.

The refinements described hereinafter relate to both, the system and the control method.

According to one embodiment, to reduce the at least one object the circuit may be configured to fade out the object and/or to make the object in the image smaller and/or to increase the transparency of the object and/or to move the object within the image away from a central position into a predetermined area. The object may be moved from a position in the main viewing direction of the driver towards a boundary, so that the object is not disturbing the driver while viewing the traffic in front. An uncritical area, the object may be moved to, is a lower edge of the image area, so that the drivers may see the object virtually before the engine bonnet of the vehicle.

According to one embodiment, the circuit may be configured during or after the reduction to output the message associated with the object by means of another object in another display different from the front windshield.

According to one embodiment, the circuit may be configured to identify an input by the user. The circuit may be configured, based on the input, to start an application program, whereby the object is associated with the application program.

According to one embodiment, the circuit may be configured to prioritize the objects. The circuit may be configured to reduce first the object with the lowest priority in the second workload mode.

According to one embodiment, the circuit may be configured to switch to a warning mode. The circuit may be configured to reduce at least one of the objects of the set in the warning mode and to output at least one warning object at least temporarily in the image data.

The previously described embodiment variants are especially advantageous both individually and in combination. In this regard, all embodiment variants can be combined with one another. Some possible combinations are explained in the description of the exemplary embodiments shown in the figures. These possible combinations of the embodiment variants, depicted therein, are not definitive, however.

BRIEF DESCRIPTION OF FIGURES

The invention will be described in greater detail hereinafter by exemplary embodiments using graphic illustrations.

In the drawing.

DETAILED DESCRIPTION

Figure 1:
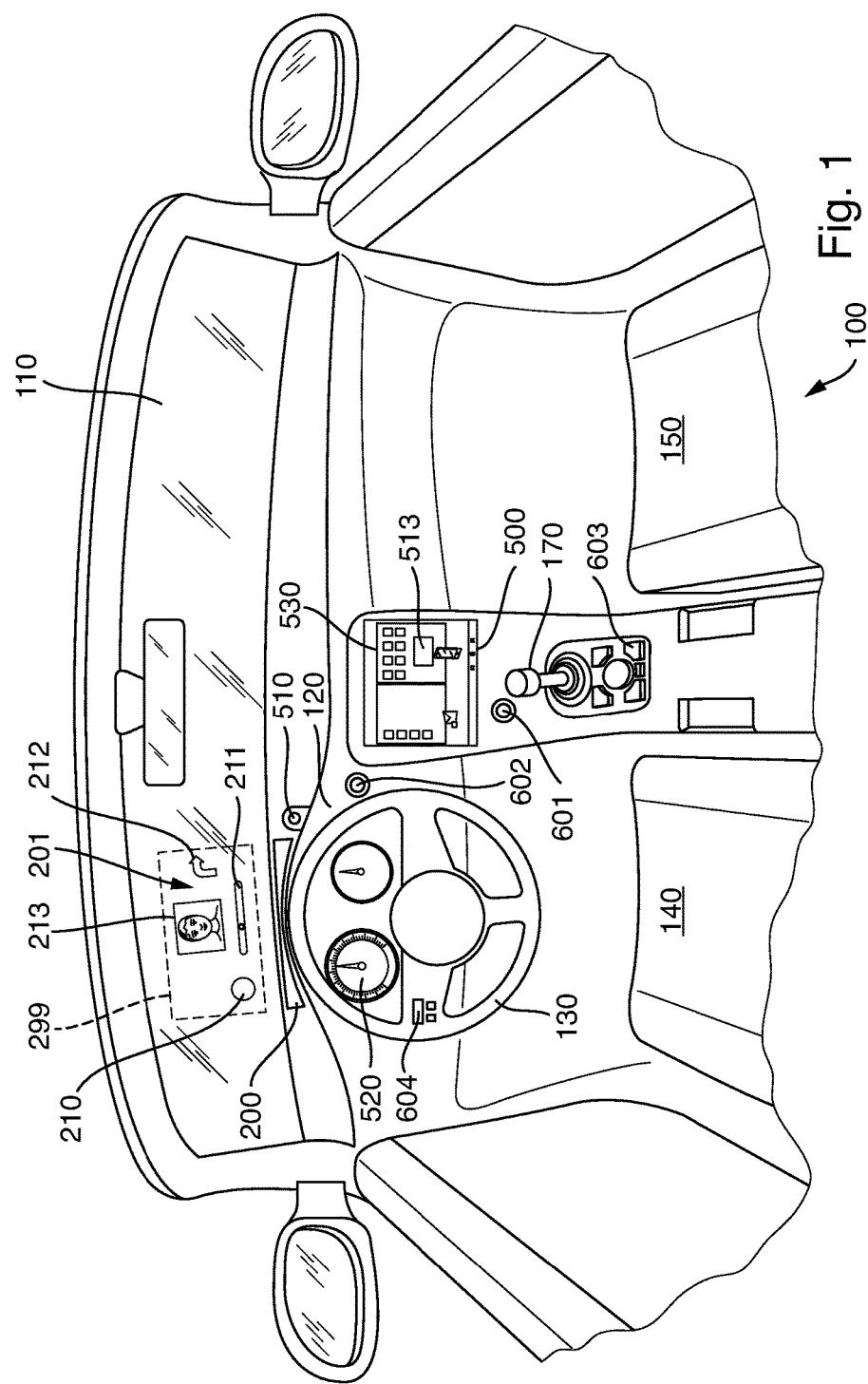
FIG. 1 shows a schematic view of a vehicle interior.

A view of a vehicle interior is shown schematically in FIG. 1. An image 201 may be projected in a reflection area 299 onto a front windshield 110 of a vehicle 100. The image 201 may be generated by a head-up display 200. The head-up display 200 may also be referred to as head unit display. The driver, who observes the traffic ahead through front windshield 110, has the projected image 201 at least partially in his field of vision. To enable a largely unobstructed view of the traffic ahead, large parts of image 201 may be made transparent or semitransparent, so that the driver can also easily see real objects or persons behind objects 210, 211, 212, 213 of image 201. Objects 210, 211, 212, 213 may be predominantly important information for the driver, such as a traffic sign 210 and/or a vehicle- and/or route-related display 211 and/or a navigation symbol 212 and/or a message image 213. In one embodiment of FIG. 1, objects 210, 211, 212, 213 may be virtual two- and/or three-dimensional elements of an augmented reality.

In one embodiment of FIG. 1, a corresponding picture 513 may be shown in a central display 530 for projected object 213 "message image."

The driver can rapidly receive information via image 201 of head-up display 200 without having to look away from traffic. In principle, it is therefore desirable to make as much information as possible available to the driver via head-up display 200. A too high information density, in contrast, can overload the driver or distract him from traffic, when the information needed in the current situation, e.g., navigation symbol 212, is "hidden" between other objects 312, 211, 210 in image 201.

To optimize the provision of information in image 201, an adaptive workload management system may be implemented in an infotainment system of vehicle 100. Accordingly, the system may have a head-up display 200 and a circuit 540. Circuit 540 is shown schematically in FIG. 2 as part of a central unit 500. The circuit 540 may be connected to the head-up display 200. The head-up display 200 according to the embodiment of FIG. 1 may be configured to project image 201 onto a reflection surface of front windshield 110 of vehicle 100. The focus of the projected image 201 in so doing can be adjusted in such a way that image 201 is optically sharp for the user in front of the front windshield, for example, virtually floating above the hood.

The circuit 540 may be configured to output image data S200 to the head-up display 200 in order to generate the image 201. The image data S200 here may include objects 210, 211, 212, 213 illustrated in the embodiment of FIG. 1. Said objects 210, 211, 212, 213 may include messages for the user, particularly for the driver.

The circuit 540 may be configured to determine a level L of a user's workload based on a set of driving conditions. In one embodiment of FIG. 2, level L may be determined by means of a first function block 541 of the circuit 540. The driving conditions can be determined by sensors. In one embodiment, circuit 540 may be connected to a database 690 for requesting map data S690. In addition, a position of the vehicle 100 may be determined by means of position data S609 of a satellite receiver 690. As driving conditions, thus, for example, the distance or time interval to the next maneuver point or the density of intersections in the area of the position of vehicle 100 can be determined from position data S609 and map data S690. To determine the driving conditions, image data S611, S612 of capturing devices 611, 612 can also be evaluated to determine, for example, a density of vehicles in the immediate vicinity of vehicle 100 and/or a traffic speed as driving conditions. Driving conditions thus can be determined based on different traffic-related sensed data (speed, distance, etc.) and/or traffic-related received data (traffic reports, traffic signal control, etc.) and/or traffic-related stored data (map data, total driving time, etc.). The level L of the workload can be determined by means of algorithms or fuzzy logic from the driving conditions. The level L in this case may be a value or vector or a matrix.

The circuit may be configured, based on the level L, to switch between at least a first workload mode M1 and a second workload mode M2. The first workload mode M1 and the second workload mode M2 may be controlled in a second function block 542 of circuit 540. The level L may be evaluated to determine the specific workload mode M1, M2. The level L may be evaluated by means of an algorithm. In the simplest case, the level L may be compared with a threshold.

To the second workload mode M2 a higher level L is assigned than to the first workload mode M1. If level L exceeds a threshold in one especially simple embodiment, the second workload mode M2 is active. If, in contrast, level L falls below the threshold, the first workload mode M1 is active.

The output of image 201 in head-up display 200 may be controlled in such a way with first workload mode M1 and second workload mode M2 that the workload is adaptively adjusted to the driving situation. For example, the arrival time and the current speed are not required in an upcoming lane change. To change a lane, the driver rather should be able to concentrate completely on the traffic. A mere delay in information output is not helpful here. Rather, the goal in the second workload mode M2, which belongs to a higher workload level L, is to reduce the information in the image of head-up display 200 in order to increase the transparency. Accordingly, circuit 540 may be configured in the second workload mode M2 to reduce at least one object 210, 213 of the set, output in the first workload mode M1. To reduce the object 210, 213, the object 210, 213 can be faded out or the object 210, 213 may be output smaller or transparent. By means of this reduction of the object 210, 213, the visibility of the traffic in front of vehicle 100 is increased and at the same time the driver's attention to the remaining objects 212 is increased.

In one embodiment, circuit 540 may be configured after the reduction to output the message associated with object 212, 213 by means of another object 513 in another display 520 apart from front windshield 110. If message image 213 in FIG. 1 is faded out because of the change to second workload mode M2, the associated message image 513 may be faded in on the central display 530 concurrently. Thus, viewing and subsequent operation by the front-seat passenger are possible. If there is no front-seat passenger in the car, the driver can continue the operation later, i.e., under different traffic conditions, for example, via central unit 500.

In one embodiment an imaging system may be provided in connection with an infotainment system of a motor vehicle 100. FIG. 1 shows a schematic representation of an example of a vehicle interior. In one embodiment of FIG. 1, the vehicle 100 may include a driver seat 140 and a passenger seat 150. The vehicle 100 may further include a steering wheel 130 on the driver's side and a gear shift 170 and a front windshield 110. In one embodiment of FIG. 1 an infotainment system may be provided. The infotainment system may have an information display 530 in the form of a user interface. The central information display 530 may be centrally arranged in the dashboard 120 of the vehicle 100. The central information display 530 may be a touch screen, comprising a touch sensitive surface for user input. The infotainment system may have, or be in communication with an instrument cluster display 520. In one embodiment, the instrument cluster display 520 may be arrange inline with the position of the steering wheel 130, so that the user may see the displayed information content through openings of the steering wheel 130. The instrument cluster display 520 may be a colour screen. The infotainment system may have a head up display 200. The head up display 200 may be configured to project an image 201 onto the front windshield 110. A surface of the front windshield 110 may reflect the projected image towards the user, in one embodiment of FIG. 1, towards the driver of the vehicle 100. In one embodiment shown in FIG. 1 the projected image 201 can be of the size of a reflection area 299. The form of the front windshield 110 may deviate from a flat reflection surface, and an electronic rectification and/or optical rectification may be used.

The infotainment system may have a first sensor 601 and a second sensor 602. The first sensor 601 and a second sensor 602 may be infrared-sensor. The first sensor 601 and a second sensor 602 can be positioned in predetermined locations, such as to sense a movement of a hand of a user of the vehicle 100. The infotainment system may have an input device 603. The input device 603 may be part of the user interface, and may have one or more push buttons, input wheels, and so forth.

Figure 2:
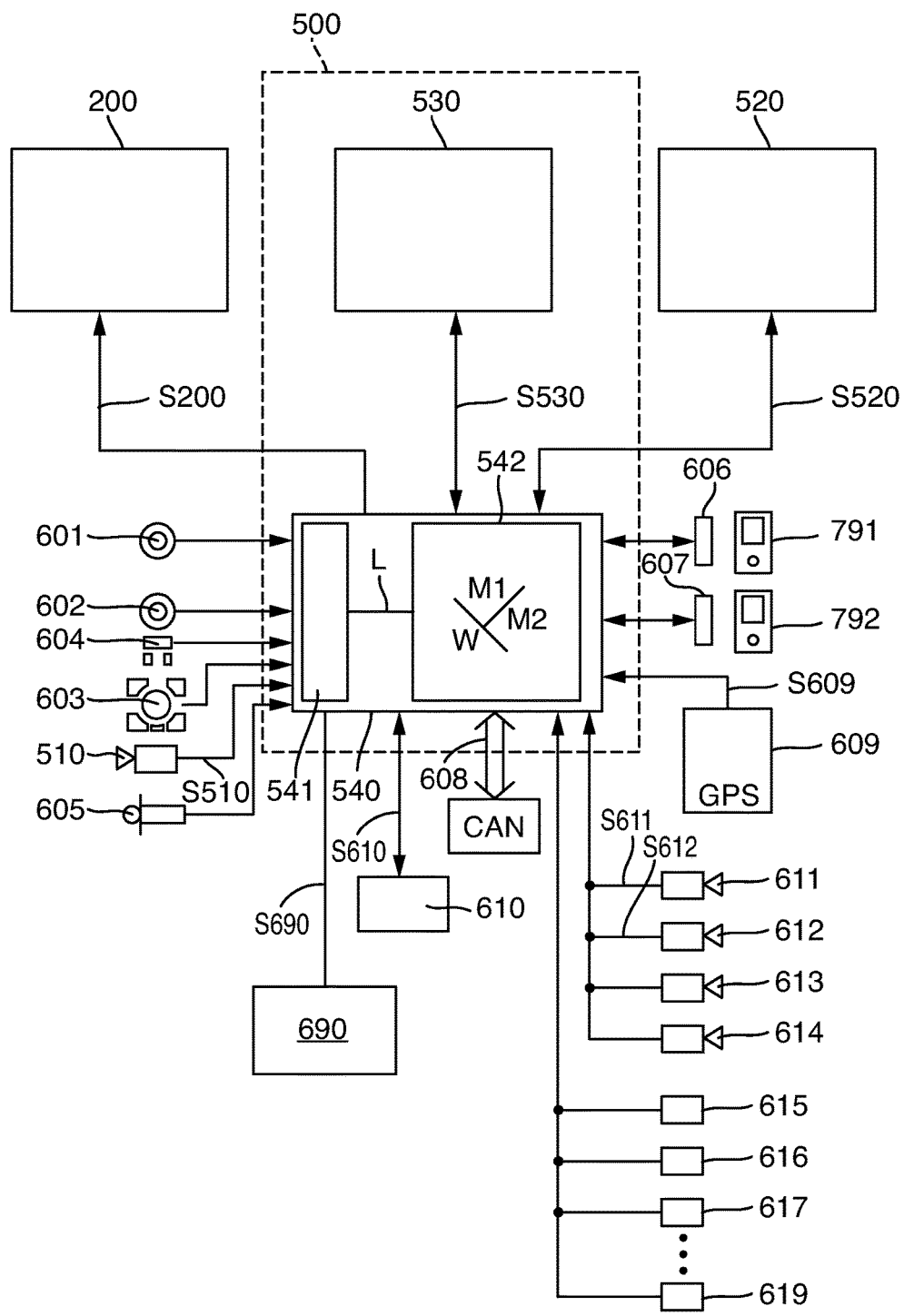
FIG. 2 shows a schematic view of an infotainment system.

FIG. 2 shows a block diagram of an example of an infotainment system. The infotainment system may have a central unit 500 having a circuit 540 comprising a processor to run a program. The central unit 500 may have a plurality of interfaces to connect other devices. A head-up display 200 and/or an instrument cluster display 520 and/or a central information display 530 and/or a first sensor 601 and/or a second sensor 602 and/or a first near field connection device 606 and/or a second near field connection device 607 and/or an input device 603 may be connected to or in communication with the circuit 540 of the central unit 500. The first near field communication device 606 and the second near field communication device 607 can be configured to connect to a mobile device 791, 792, such as to a mobile phone, or other mobile communication device in close proximity. Therefore a mobile 791 device positioned in or near the left retainer can have a connection to the first near field communication device 606 and a mobile device 792 positioned in or near the right retainer can have a connection to the second near field communication device 607.

According to one embodiment, an infotainment system of a vehicle 100 may include an imaging system. The infotainment system may have a head-up display 200 and a central information display 530 and a sensor 601, 602 for detecting a user's gestures. The infotainment system may have a circuit 540 of a central unit 500 connectable to the head-up display 200 and to the central information display 530 and to the sensor 601, 602.

The circuit 540 of the central unit 500 may be configured to send first image data S200 to the head-up display 200 and second image data S530 to the central information display 530 to be displayed. The head-up display 200 may be configured to project an image 201 onto the front windshield 110 as shown in FIG. 1. The image 201 may be based on the first image data S200.

The central information display 530 may have a screen configured to display an image based on the second image data S530. The central unit 500 may be configured to add content information to the first image data S200 for the head-up display 200 and to reduce content information from the first image data S200 for the head-up display 200, when a corresponding gesture of the user is detectable by means of the sensor 601, 602.

The first image data S200 and second image data S530 may be different. Reducing information included in the first image data S200 reduces strain on the driver. Driver's workload in comprehending the content of the image 201 is therefore reduced.

The image 201 may be projected within an area 299. The projected image 201 may be predefined, and may be adjustable by the user. The area 299 may be positioned within the driver's view. The position of the area 299 may be adjusted to the steering wheel 110, so that the image 201 is viewable by the driver while also being able to observe the traffic in front of the vehicle 100. The image 201 may be at least partially transparent, such as semitransparent. At least parts of the area 299 may be transparent during driving, so that the driver's view is not obstructed significantly.

According to one embodiment, an infotainment system of a vehicle 100 that includes the imaging system is provided. The infotainment system may have a display 200, 520, 530. The infotainment system may have a sensor 601 for detecting gestures of a user. The infotainment system may have a circuit 540 of a central unit 500 connectable to the display 200, 520, 530 and to the sensor 601, 602. The sensor 601, 602 may be of a contactless type. The sensor 601, 602 may be an infrared sensor.

An interior camera 510 may be connected to circuit 540 of the central unit 500. The interior camera 510 may be aligned to record a user's face, especially the face of the driver of the vehicle 100, to determine eye movements. The infotainment system may have a microphone 605 to record the voice of the user. The infotainment system may be configured to run a voice recognition program. The infotainment system may have an interface 608 to a CAN bus of the vehicle 100 to retrieve data of the vehicle 100, e.g. the current speed, vehicle rain sensor data, and so forth. The infotainment system may have a satellite receiver 609 to receive position data S609 of the current position of the vehicle 100, such as GPS data or GLONASS data.

The infotainment system may have one or more cameras 611, 612, 613, 614 positioned to record an image of the surroundings 400 of the vehicle 100. According to one example, circuit 540 of the central unit 500 may be connected to a front camera 611 capturing image data S611 of the road and traffic in front of the vehicle 100. The circuit 540 of the central unit 500 may be connected to a back camera 612 capturing image data S612 of the road and traffic behind the vehicle 100. The circuit 540 of the central unit 500 may be connected to a left camera 613 and/or to a right camera 614 recording an image correspondingly. The one or more cameras 611, 612, 613, 614 may be used to record a complete surroundings of the vehicle 100 concurrently. The central unit 500 may be configured to run an object recognition program to recognize objects, such as road users like vehicles, in the recorded image data S611, S612.

The infotainment system may have one or more distance sensors 615, 616, 617, 619. The distance sensors 615, 616, 617, 619 may be ultrasonic sensors or radar sensors, or any other device or system for measuring distance that is connectable to the circuit 540 of the central unit 500.

According to one embodiment, circuit 540 may be configured to switch to a warning mode W. Warning mode W in FIG. 2 may be controlled by second circuit block 542 of circuit 540. Circuit 540 may be configured to reduce at least one of the objects 212, 213 of the first set in warning mode W and concurrently or immediately thereafter to output at least one warning object 218 at least temporarily in image data S200.

Figure 3:
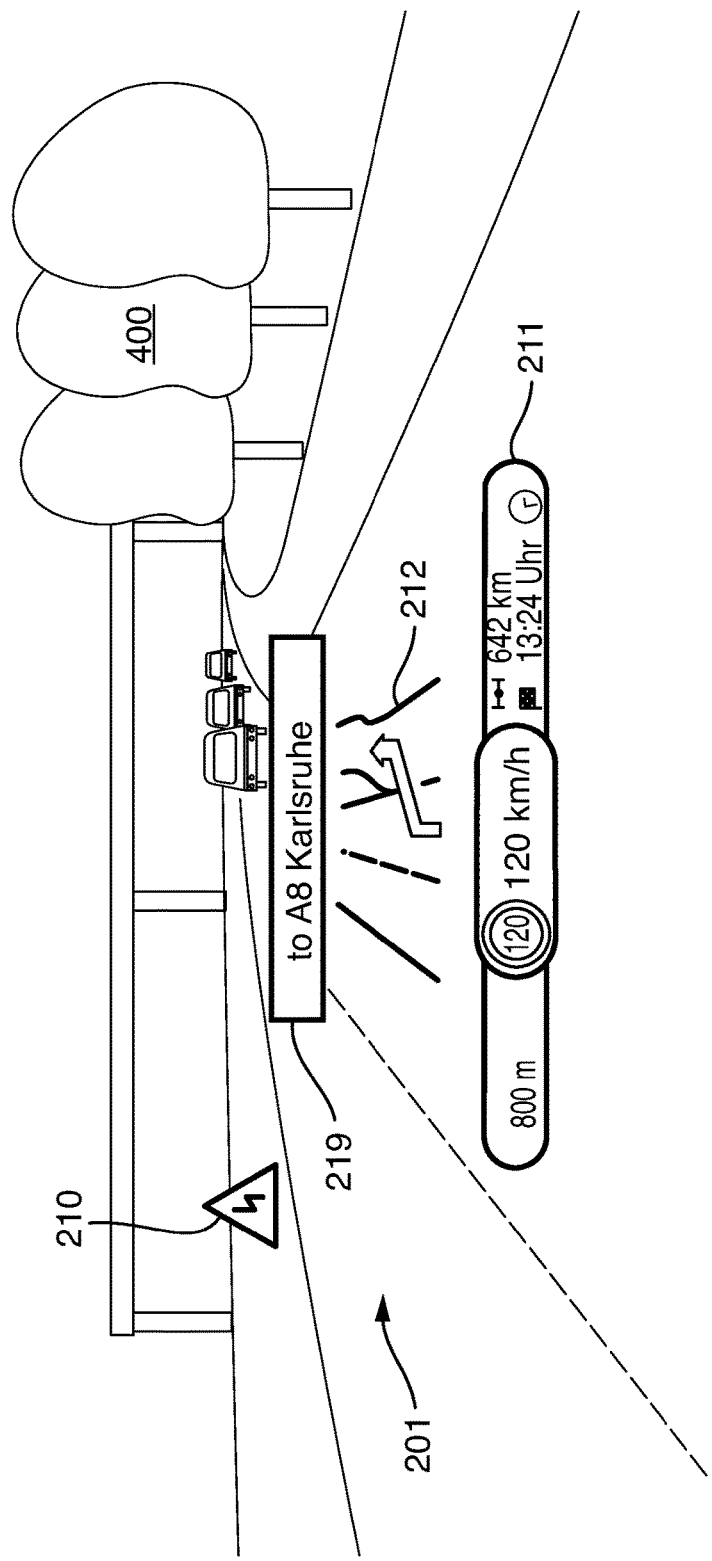
FIG. 3 shows a schematic view of an augmented reality.

According to one embodiment of FIG. 3, driving and/or navigation information may be displayed in a head-up display 200, generating an augmented reality. In the example of FIG. 3, a route guidance symbol 212 and information 211 regarding the current speed and speed limit of the vehicle are displayed. Additionally displayed is a text 219 corresponding to the next maneuver instruction and a traffic symbol 210 obtained from object recognition or map data.

The user may input by making a gesture at a sensor 601, 602 to reduce information displayed. The central unit 500 may be configured to display one or more route guidance symbols 212 for a predefined time frame. The central unit 500 may be configured to display the route guidance symbols 212 depending on the current position of the vehicle 100 and a next maneuver point on a previously calculated route.

One embodiment in FIG. 3 shows a plurality of objects 210, 211, 212, 219 of an image 201, which may be projected onto a front windshield (not shown in FIG. 3). Objects 210, 211, 212, 219 may be within the viewing direction of the driver, who may observe the surroundings 400 of vehicle 100 likewise in the same viewing direction. The objects in FIG. 3 may show a status display 211 with information on the distance to the next maneuver point, here 800 m, with information on the speed limit, here 120 km/h, and the current speed, here 120 km/h, and the distance to the destination, here 642 km, and the arrival time, here 13:24. Provided the driver's workload is low, for example, because of the low traffic density, all symbols can be displayed simultaneously. If the workload level L increases and the second workload mode M2 is reached, the transparency of image 201 may be increased in that displayed objects 210, 211, 212, 219 are reduced.

Figure 4:
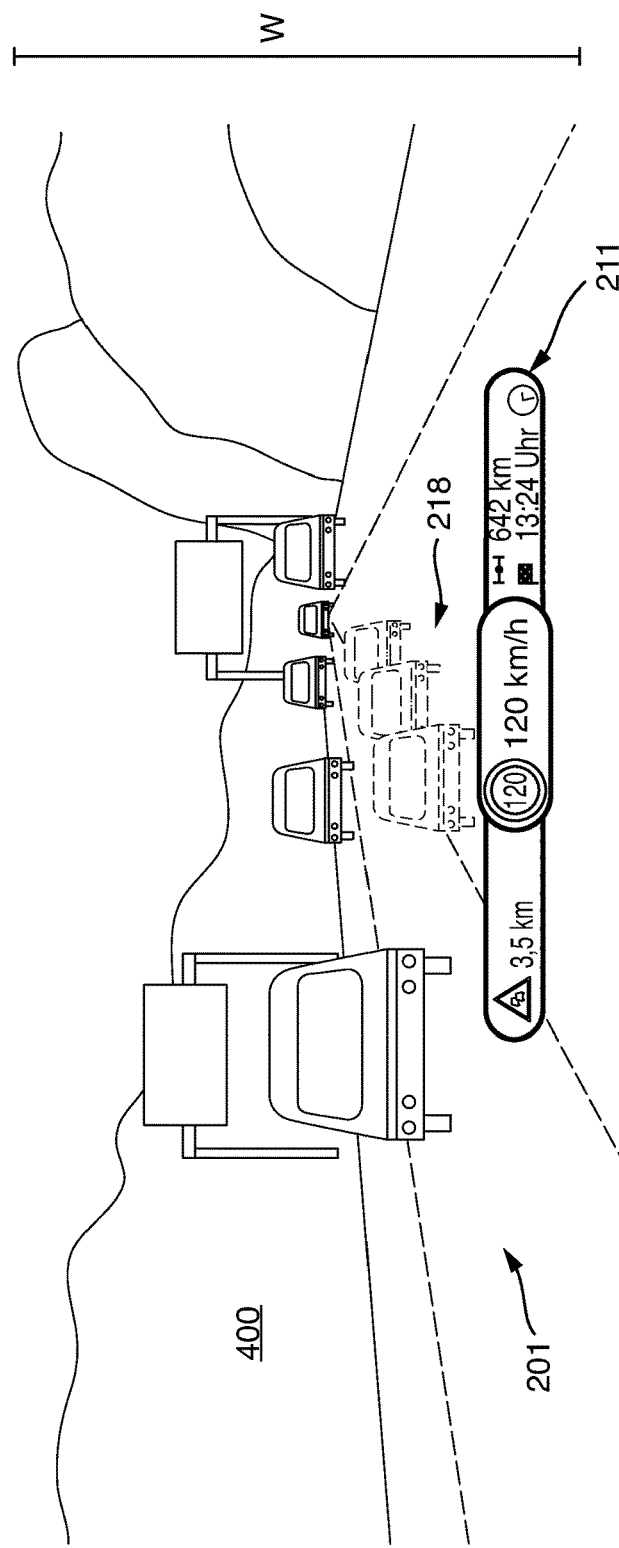
FIG. 4 shows a further schematic view of an augmented reality.

In one embodiment of FIG. 4, a warning mode W may be displayed which can be controlled by circuit 540. In warning mode W of FIG. 4, a traffic congestion symbol 218 may be output as warning object 218. Traffic congestion symbol 218 may be faded into image 201. Previously, at least one of objects 212, 213, for example, a route guidance symbol 212 may be reduced by circuit 540 by fading out route guidance symbol 212. Warning mode W may have a higher priority relative to each workload mode M1, M2, because in a dangerous situation the driver is to be warned immediately by warning mode W, for example, to prevent a collision with another vehicle or collision on the shoulder. Therefore, each workload mode M1, M2 may be overridden by warning mode W. The circuit 540 may be configured to change to one of the workload modes M1, M2 after the warning mode ends. In one embodiment of FIG. 4, a still remaining object 211 may be displayed in image 201 in addition to warning object 218. The remaining object 211 can be alternatively also faded out or made smaller.

Warning mode W can be determined in different ways. In one embodiment, circuit 540 may be configured to control warning mode W based on received traffic data, whereby the traffic data can be transmitted, for example, via the radio or a wireless network (UMTS, LTE, etc.). In one further embodiment, the circuit 540 may be configured to determine warning mode W based on measured data for the surroundings 400 of vehicle 100. The warning mode W may be determined based on a density of vehicles in the surroundings 400. The density of the vehicles may be determined by means of object recognition or distance measurement (radar).

According to one example of FIG. 4, a warning symbol 218 may be displayed in a head-up display 200. The circuit 540 of the central unit 500 may be configured to output the warning symbol 218 automatically, if, for example, a critical traffic situation is estimated. In the FIG. 4, a warning symbol 218 for congestion in front of the vehicle 100 is displayed. The central unit 500 may be configured to estimate a critical traffic situation based on received data, like RDS traffic data. The central unit 500 may be configured to estimate a critical traffic situation based on measured data.

According to one embodiment of FIG. 4, an infotainment system of a vehicle 100 that includes an imaging system is provided. The infotainment system may have a head-up display 200. The infotainment system may have a central unit 500 connectable to the head-up display 200.

The circuit 540 of the central unit 500 may be configured to send image data S200 to the head-up display 200 to be displayed. The head-up display 200 may be configured to project an image 201 onto the front windshield 110. The image 201 may be based on the image data S200.

The central unit 500 may be configured to output a first information item 218 and a second information item 212. The first information item 218 may have a higher priority than the second information item 212. The central unit 500 may be configured to replace the second information item 212 by the first information item 218, when an alert signal is estimated based on measured traffic-related data and/or received traffic-related data.

The average speed of road users in front of vehicle 100 may be compared with a threshold. If the average speed of the road users is below the threshold a warning symbol 218 as the first information 218 may be displayed. Traffic congestion data may be received wirelessly, such as from a radio station. As the vehicle 100 approaches the traffic congestion a warning symbol 218 may be shown as the first information 218. The second information 212 of lower priority is, for example, a route guidance symbol 212, as shown in FIG. 3.

Figure 5:
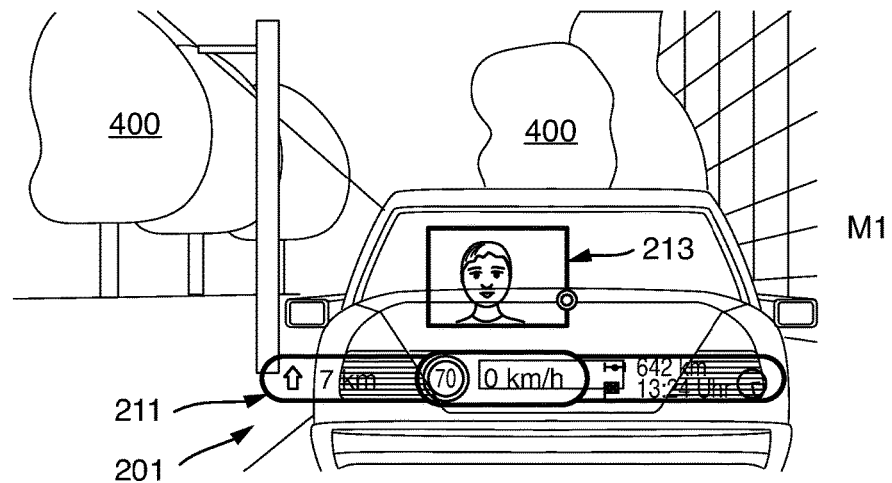
FIG. 5 shows a further schematic view of an augmented reality.

According to one embodiment, a first workload mode M1 may be controlled in FIG. 5. In the first workload mode M1, an object 213 of an application program for a telephone function of vehicle 100 may be displayed in an image 201 as a message for the user. Object 213 may show a picture of a person, who is associated with an entry in an electronic phone book. The image 201 may be projected onto a front windshield 110 of vehicle 100, so that the surroundings 400 with vehicle ahead can be observed behind image 201 by the driver. The vehicle 100 and vehicle ahead are not moving in the first workload mode M1 of FIG. 5.

Figure 6:
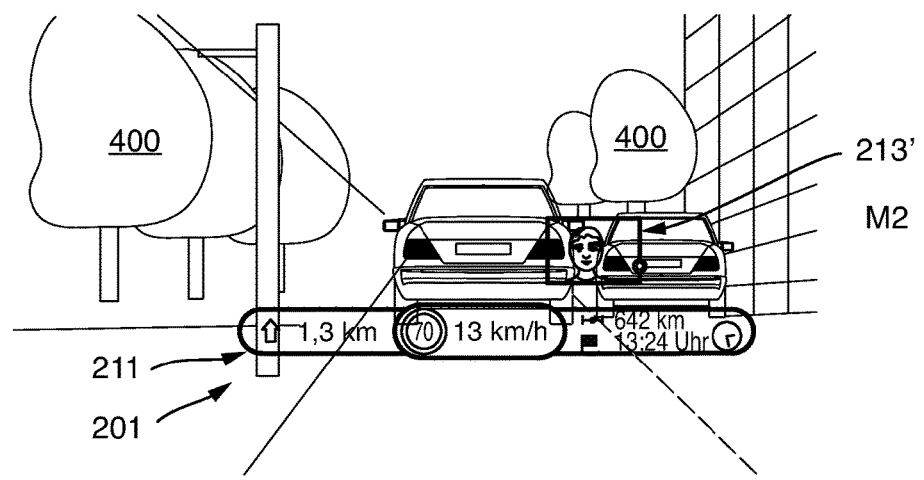
FIG. 6 shows a further schematic view of an augmented reality.

In contrast, in one embodiment of FIG. 6, the driving condition may be provided that the vehicle 100, like the vehicle ahead, may be moving. Based on a measured speed of vehicle 100, the workload level L may be increased and it may be changed to a second workload mode M2. In the second workload mode M2, object 213' may be reduced by making object 213' smaller. In addition, object 213' may be reduced by moving object 213' within image 201 out of the driver's central view to the edge of image 201.

According to one embodiment, an infotainment system of a vehicle 100 that includes an imaging system is provided. The infotainment system may have a head-up display 200. The infotainment system may have a central unit 500 having a circuit 540 connectable to the head-up display 200. The central unit 500 may be configured to send image data S200 to the head-up display 200 to be displayed. The head-up display 200 may be configured to project an image 201 onto the front windshield 110 or onto a separate combiner. The image 201 may be based on the image data S200. The central unit 500 may be configured to output a graphic 213 (picture, text). The central unit 500 may be configured to size the graphic within the image data S200, so that the size of the graphic 213' is smaller when the vehicle 100 is in motion, such as during driving of the vehicle 100, in comparison with the size of the graphic 213 when the vehicle 100 is not in motion.

The central unit 500 may be configured to move the graphic 213 within the image data S200, so that graphic 213' is moved from a central position to an edge area in the image data S200.

According to one embodiment of FIG. 5 and FIG. 6 a graphic 213 is first centrally displayed. The graphic 213 corresponds to an incoming phone call. The driver starts driving in FIG. 6, so that the size of the graphic 213' is reduced and the graphic 213' is moved to an edge of the displayed image 201. According to one embodiment, the graphic 213' is moved further to the right side. According to one embodiment of FIG. 5 and FIG. 6 the projected image 201 is partly transparent. In the embodiment of FIG. 5 and FIG. 6, the main part is transparent showing the surroundings 400 of the vehicle 100.

Figure 7:
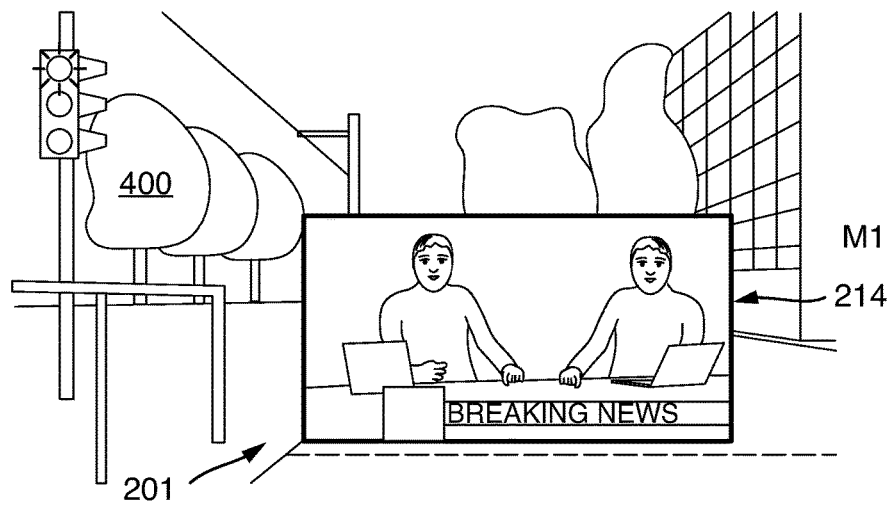
FIG. 7 shows a further schematic view of an augmented reality.
Figure 8:
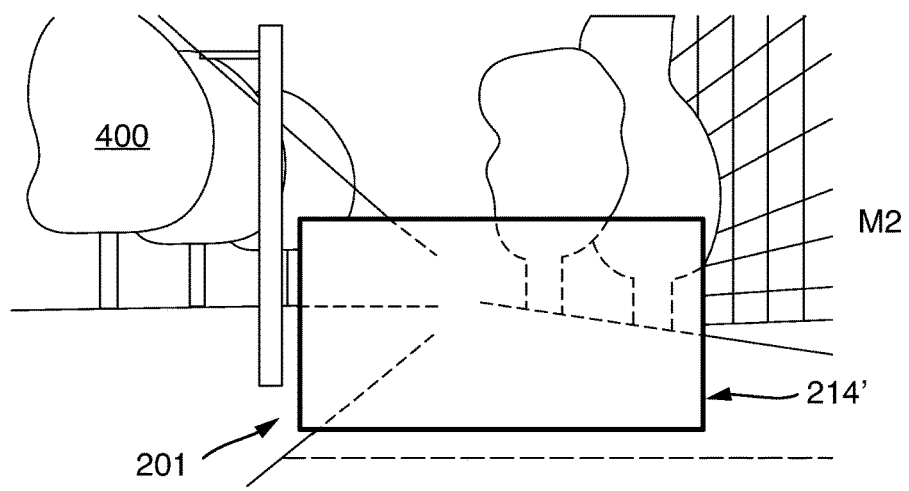
FIG. 8 shows further schematic views of an augmented reality.

One further embodiment with a change from a first workload mode M1 to a second workload mode M2 is shown schematically in FIGS. 7 and 8. In one embodiment for FIG. 5, circuit 540 may be configured to output a video object 214 in image 201 as a message for the user. The video object may show news, which were received earlier and stored. Alternatively to one embodiment in FIG. 5, other information can also be output, for example, e-mails or SMS [short message service] as a graphical object.

According to one embodiment of FIG. 7, a central unit 500 of an infotainment system may be configured to stream a video to a head-up display 200. The central unit 500 may be configured to stop the displaying of the video depending on a received signal. In one embodiment of FIG. 7, the video may be stopped and faded out, as shown in the embodiment of FIG. 8, before the traffic light turns green. In this case the central unit 500 may be configured to receive the remaining time of the red phase from the urban infrastructure.

The driving condition may be defined in one embodiment of FIG. 6 by a receive signal. Based on the receive signal, the workload level L may be increased and it may be changed to the second workload mode M2. In the second workload mode M2, object 214' may be faded out, for example, by a continuous increase in the transparency.

Figure 9:
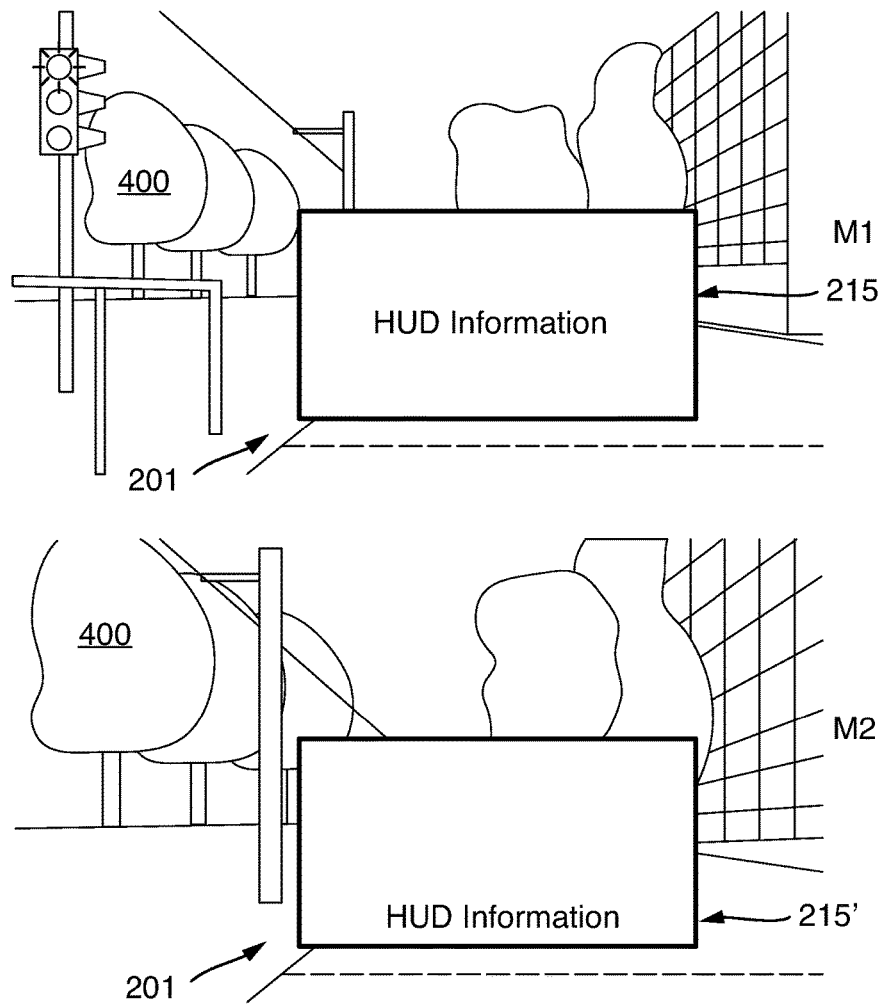
FIG. 9 shows a further schematic view of an augmented reality.

One further embodiment with a change from a first workload mode M1 to a second workload mode M2 is shown schematically in FIG. 9. After a red traffic light, the vehicle may begin to move, whereby the driving condition again changes from standing still to moving. The change may be determined by means of a GPS receiver from received data or from a camera's image data. One object 215 may show as a message for the driver in head-up display 200 information of the traffic situation on a calculated route. With the second workload mode M2, the object 215 may be reduced by moving the text from the center to the lower edge of image 201, so that surroundings 400 can be observed unobstructed by the driver.

According to one embodiment of FIG. 9, the possibility of reducing the information in a head-up display 200 is provided. An infrared sensor 602 between an instrumentation cluster display 520 and the head-up display 200 may be used to reduce or add information by gesture.

The aforementioned embodiments provide an imaging system of a motor vehicle 100. The imaging system may have an image capture device 611 which is configured to record an image of the surroundings of the motor vehicle 100 in the form of image data S611, as shown also in FIG. 2.

A central unit 500 of the imaging system may include or be in communication with a circuit 540, which may have an processor 540. The processor 540 may be configured to determine a virtual space from the image data S611. The processor 540 may be configured to detect a real object in the image data S611. The processor 540 may be configured to add a virtual element to the virtual space.

The imaging system may be a part of an infotainment system of the motor vehicle 100, the infotainment system being connected to the image capture device 611, for example, via cables or a communication bus.

The image capture device 611 may be an optical system for recording image data S611. The image capture device 611 may have a plurality of cameras, for example, CMOS or CCD cameras. The cameras may be situated for stereoscopic recording. The processor 540 may be a central processing unit (CPU) or a digital signal processor (DSP).

The virtual space may be determined in three dimensions based on the geometry of a road of the surroundings 400. For example, a distance may be ascertained based on the geometry of a road, and the detected object may be situated in the ascertained distance within the virtual space.

While various embodiments of the invention have been described, it will be apparent to those of ordinary skill in the art that many more embodiments and implementations are possible within the scope of the invention. Accordingly, the invention is not limited to the aforementioned embodiments.

The invention claimed is:

1. A system for a vehicle, comprising:
a head-up display; and
a circuit, which is connected to the head-up display,
wherein the head-up display is configured to project an image onto a front windshield of the vehicle or onto a separate combiner,
wherein the circuit is configured to output image data to the head-up display in order to generate the image, whereby the image data has a set of objects which includes messages for a user,
wherein the circuit is configured to determine a user's workload level for operating the vehicle, based on a set of driving conditions, the set of driving conditions including at least a road situation,
wherein the circuit is configured, based on the user's workload level, to switch between at least one first workload mode and a second workload mode, whereby the second workload mode is assigned a higher user's workload level than the first workload mode,
wherein the circuit is configured, in the second workload mode, to reduce at least one object, which is output in the first workload mode such that a combined user's workload comprising the user's workload level for operating the vehicle and a user's workload for comprehending a content of the image is reduced in the second workload mode as compared to the first workload mode, and
wherein, to reduce the at least one object, the circuit is configured
to make the object in the image smaller, or
to increase a transparency of the object and fade out the object.

2. The system according to claim 1,
wherein, to reduce the at least one object, the circuit is further configured
to move the object within the image away from a central position into a predetermined area.

3. The system according to claim 1,
wherein the circuit is configured, during or after the reduction, to output a message associated with the object by means of another object in another display apart from the front windshield or combiner.

4. The system according to claim 1, wherein
the circuit is configured to determine an input by the user, and
the circuit is configured, based on the input, to start an application program, whereby the object is associated with the application program.

5. The system according to claim 1, wherein
the circuit is configured to prioritize the objects of the set, and
the circuit is configured to reduce first the object with a lowest priority in the second workload mode.

6. The system according to claim 1, wherein
the circuit is configured to switch to a warning mode, and
the circuit is configured, in the warning mode, to reduce at least one of the objects of the set and to output at least one warning object at least temporarily in the image data.

7. A method for controlling a head-up display for a vehicle, comprising:
projecting an image onto a front windshield of the vehicle or onto a separate combiner by means of the head-up display,
outputting image data from a circuit, connected to the head-up display, to the head-up display to generate the image, whereby the image data has a set of objects that includes messages for a user,
determining a level of a user's workload for operating the vehicle based on a set of driving conditions by means of the circuit, the set of driving conditions including at least a road situation,
switching between at least a first workload mode and a second workload mode based on the user's workload level, whereby the second workload mode is assigned a higher user's workload level than the first workload mode, and
reducing at least one object of the set, output in the first workload mode, in the second workload mode, such that a combined user's workload comprising the user's workload level for operating the vehicle and a user's workload for comprehending a content of the image is reduced in the second workload mode as compared to the first workload mode,
wherein reducing the at least one object includes
moving the object within the image away from a central position into a predetermined area, and
fading out the object.

8. The system according to claim 1, wherein the circuit is configured to determine the user's workload level based on a traffic density.

9. The system according to claim 1, wherein, to reduce the at least one object, the circuit is configured to move the object within the image away from a central position to an edge area of the image.

10. The system according to claim 1,
wherein the at least one object comprises a video object,
wherein the circuit is configured to determine the user's workload level based on a remaining time of a red phase of a traffic light, and
wherein the circuit is configured, in the second workload mode, to stop and fade out the video object.

11. The system according to claim 1, wherein the at least one object comprises a text object, wherein the circuit is configured to determine the user's workload level based on a transition of the vehicle from standing still to moving, and wherein the circuit is configured, in the second workload mode, to move the text object within the image from a central position to a lower edge of the image.

12. A system for a vehicle, the system comprising:

a head-up display; and a circuit, which is connected to the head-up display, wherein the head-up display is configured to project an image onto a front windshield of the vehicle or onto a separate combiner, wherein the circuit is configured to output image data to the head-up display in order to generate the image, whereby the image data has a set of objects that include messages for a user, wherein the circuit is configured to determine a user's workload level based on a set of driving conditions, wherein the circuit is configured, based on the user's workload level, to switch between at least one first workload mode and a second workload mode, whereby the second workload mode is assigned a higher user's workload level than the first workload mode, wherein the circuit is configured, in the second workload mode, to reduce at least one object, which is output in the first workload mode, wherein the at least one object comprises a video object, wherein the circuit is configured to determine the user's workload level based on a remaining time of a red phase of a traffic light, and wherein the circuit is configured, in the second workload mode, to stop and fade out the video object.

13. The method of claim 7, further comprising prioritizing the objects of the set, and wherein reducing the at least one object includes reducing first the object with a lowest priority in the second workload mode.

14. The method of claim 7, further comprising determining the user's workload level based on a traffic density.

15. The method of claim 7, wherein the at least one object comprises a text object, the method further comprising determining the user's workload level based on a transition of the vehicle from standing still to moving, and, in the second workload mode, moving the text object within the image from a central position to a lower edge of the image.

\* \* \* \* \*

UNITED STATES PATENT AND TRADEMARK OFFICE
CERTIFICATE OF CORRECTION

| | |
|---|---|
| PATENT NO. | : 10,071,747 B2 |
| APPLICATION NO. | : 14/654484 |
| DATED | : September 11, 2018 |
| INVENTOR(S) | : Roth et al. |

It is certified that error appears in the above-identified patent and that said Letters Patent is hereby corrected as shown below:

On the Title Page

Item (72) Inventor ADD:
--Kelei Shen, Dulach, DE;
Michael Reuss, Bretten, DE;
Alexa Wackernagel, Vilters, CH;
Stephan Bergmann, Muggensturm, DE;
Stefan Marti, Oakload, CA--.

Signed and Sealed this
Ninth Day of January, 2024

Katherine Kelly Vidal
*Director of the United States Patent and Trademark Office*